(12) United States Patent
Shepherd et al.

(10) Patent No.: US 8,462,018 B1
(45) Date of Patent: Jun. 11, 2013

(54) SYSTEMS AND METHOD FOR CONTROLLING THE SIMULTANEOUS DISPLAY OF MULTI-LEVEL CLASSIFIED INFORMATION ON THE SAME SURFACE OF AN AIRCRAFT DISPLAY UNIT

(75) Inventors: Karl L. Shepherd, Cedar Rapids, IA (US); Greg L. Shelton, Cedar Rapids, IA (US); Nicholas A. Paxton, Cedar Rapids, IA (US); David G. Stobb, Cedar Rapids, IA (US); Yves LaCerte, Eden Prairie, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 204 days.

(21) Appl. No.: 13/116,043

(22) Filed: May 26, 2011

(51) Int. Cl.
*G08B 21/00* (2006.01)

(52) U.S. Cl.
USPC .............................................. 340/945; 726/3

(58) Field of Classification Search
USPC ...................... 340/945; 713/166; 726/3, 34, 6
See application file for complete search history.

(56) References Cited

U.S. PATENT DOCUMENTS 7,069,437 B2 * 6/2006 Williams ...................... 713/166

* cited by examiner

*Primary Examiner* — Shirley Lu
(74) *Attorney, Agent, or Firm* — Donna P. Suchy; Daniel M. Barbieri

(57) ABSTRACT

A present novel and non-trivial system and method for controlling the display of classified information with unclassified information are disclosed. Layer property(ies) of the super layer are turned on. Layer property(ies) of at least one unclassified layer is turned on, making it a changed unclassified layer. Unclassified layer data of each changed unclassified layer is sent to a user application, and responsive first first-tier widget data is received. Pixel data set is generated based upon the unclassified layer data, the first first-tier widget data, and a known display configuration format. Additionally, layer property(ies) of at least one classified layer is turned on, making it a changed classified layer. Classified layer data of each changed classified layer is sent to a user application, and responsive second first-tier widget data is received. The second widget data is included in the basis for generating the pixel data set.

30 Claims, 9 Drawing Sheets

SYSTEMS AND METHOD FOR CONTROLLING THE SIMULTANEOUS DISPLAY OF MULTI-LEVEL CLASSIFIED INFORMATION ON THE SAME SURFACE OF AN AIRCRAFT DISPLAY UNIT

BACKGROUND OF THE INVENTION

1. Field of the Invention

This invention pertains generally to the field of aircraft display units that provide information to the pilot or flight crew of an aircraft.

2. Description of the Related Art

Aeronautical Radio, Incorporated ("ARINC") has published ARINC Specification 661 entitled "Cockpit Display System Interfaces to User Systems" ("ARINC 661"), an industry standard which defines an architecture to facilitate a creation of interactive displays. ARINC 661 standardizes the fundamental building blocks of cockpit avionics displays by providing specifications that separates graphics from logic, defines a runtime architecture, and defines a communication protocol. The contents of ARINC 661 are known to those skilled in the art.

The Cockpit Display System ("CDS") may display widgets to the end user, where ARINC 661 specifies a standard set of widgets to develop a cockpit display; a widget may be considered as a displayable entity that is either interactive or non-interactive. At startup, the CDS loads and displays widgets listed in Definition Files ("DFs" or singularly, "DF"). Each DF is comprised of one or more layers, which are hierarchical listing of widgets that are loaded along with their initial properties such as, but not limited to, visibility and enablement. A DF may be associated with a User Application ("UA").

ARINC 661 architecture separates graphics from logic. A UA may be connected to one or more layers and owned by an aircraft system and programmed with the logic for providing updated data via widget parameters to the CDS and reacting to user interactions with a display unit. Examples of aircraft systems that could own one or more UAs include, but are not limited to, air conditioning, auto flight, communications, electrical power, equipment and furnishings, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

In addition, ARINC 661 recommends a bi-directional runtime communication protocol for the exchange of data and events. In addition, ARINC 661 specifies how each widget interacts with end-users, the CDS, and the UAs.

Although ARINC 661 provides a standard for cockpit avionics displays, ARINC 661 does not provide for security rules that may be necessary for displaying multi-levels of classified information with unclassified information. Moreover, without the implementation of safeguards and additional precautions or rules for ensuring the security of classified information, the use of ARINC 661 may result with the unwanted and/or improper presentation of classified information to a person who has not been cleared to receive such classified information.

BRIEF SUMMARY OF THE INVENTION

The embodiments disclosed herein present at least one novel and non-trivial system and method for controlling the display of classified information with unclassified information on the same surface of an aircraft display unit.

In one embodiment, a system for controlling the display of classified information with unclassified information on the same surface of an aircraft display unit, where such system may be comprised of a plurality of aircraft systems and a CDS. The plurality of aircraft systems could be comprised of one or more classified aircraft systems and one or more unclassified systems, where each classified aircraft system and each unclassified aircraft system owns at least one UA. The CDS could be comprised of a system configuration file, a windows manager UA ("WMUA"), a plurality of definition files, one or more display units, and a windows generator ("WG") configured to perform a first operation and a second operation, both of which are described in the following paragraph.

In another embodiment, a method performed by the WG for controlling the display of classified information with unclassified information on the same surface of an aircraft display unit, where such method may be comprised of two operations. The first operation may be comprised of retrieving a system configuration file, retrieving a first definition file comprised of a super layer, turning on the active property and visibility property of the super layer, retrieving a WMUA, retrieving a plurality of second definition files, and turning on one or more layer properties of at least one unclassified layer (where each such unclassified layer is then designated a changed unclassified layer). The second operation may be comprised of sending unclassified layer data to a UA of at least one changed unclassified layer, receiving first first-tier widget data from at least one first responsive UA responding to the sending of the unclassified layer data, generating a pixel data set, and providing the pixel image data set to at least one display unit.

The super layer may be comprised of a plurality of first-tier widgets, where each first-tier widget may be defined by a set of widget parameters in which a visibility parameter, an enablement parameter, and a widget identifier parameter are included; the widget identifier parameter of each first-tier widget may be comprised of a numeric identifier. Each second definition file may be comprised of at least one subordinate layer and each subordinate layer may be comprised of at least one first-tier widget, where each first-tier widget is defined by a set of widget parameters including a numeric identifier; the widget identifier parameter of each first-tier widget may be comprised of a numeric identifier. As disclosed herein, security rules for presenting classified information with unclassified information may require that the numeric identifier of each first-tier widget and of each first-tier widget is unique among all of the widgets in the super layer and all subordinate layers. Also, the WG could be programmed to include a procedure in the first operation which ensures that each numeric identifier is unique among all of the widgets in the super layer and all subordinate layers.

The plurality of first-tier widgets may be comprised of at least one first-tier interactive widget and a plurality of first-tier connector widgets, the plurality of first-tier connector widgets may be comprised of one or more classified connector widgets and one or more unclassified connector widgets. Furthermore, each classified connector widget may connect to one layer owned by one UA of one classified aircraft system, and each unclassified connector widget may connect to one layer owned by one UA of one unclassified aircraft system. As disclosed herein, security rules for presenting classified information with unclassified information may require that no two connector widgets are connected to the same layer. Also, the WG could be programmed to include a procedure in the first operation which ensures that no two connector widgets are connected to the same layer.

In an additional embodiment, the second operation could be further comprised of the WG receiving input data associated with a procedure to access classified information and comprised of at least one access event and exchanging data with the WMUA for each access event. Access request data representative of the input data may be sent to the WMUA with each access event, and in return, first-tier interactive widget data may be received from the WMUA responding to each sending of access request data, where the first-tier interactive widget data may be representative of parameter information of at least one interactive widget in the super layer. Such first-tier interactive widget data may be included in the basis upon which the pixel data set is generated.

In an additional embodiment, the second operation could be further comprised of the WG receiving classified connector widget data from the WMUA after the exchanging of data of the preceding paragraph has been completed and a pilot's level of security clearance has been identified, turning on at least one layer property of at least one classified layer (where each such classified layer is then designated a changed classified layer), sending classified layer data to a UA of at least one changed classified layer, and receiving second first-tier widget data from at least one first responsive UA responding to the sending of the classified layer data. Such second first-tier widget data may be included in the basis upon which the pixel data set is generated.

The drawings of FIG. 5 depict a flowchart of a method for controlling the display of classified information with unclassified information on the same surface of an aircraft display unit.

Figure 6:
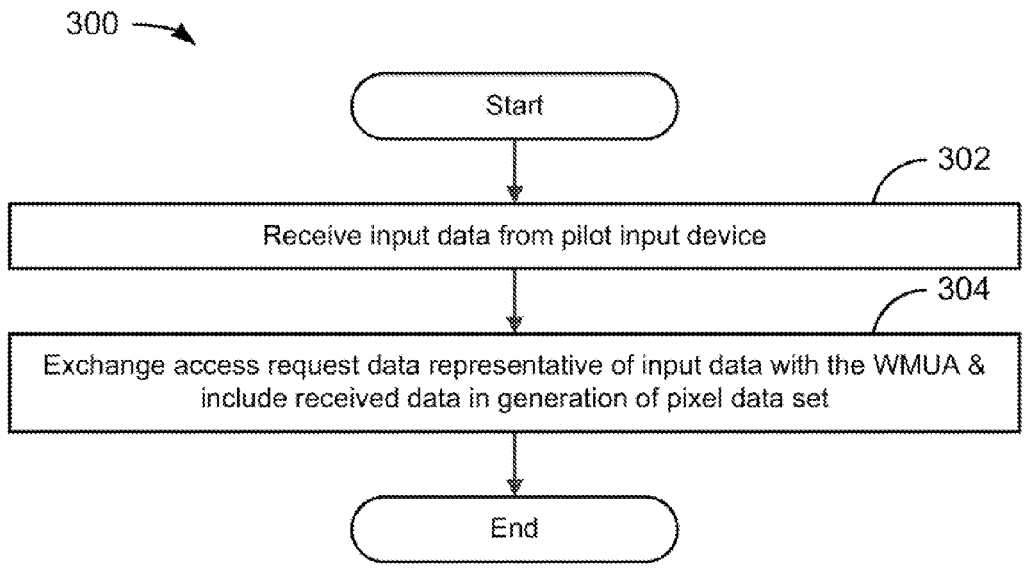

FIG. 6 depicts a flowchart of a method for gaining access to classified information.

Figure 7:
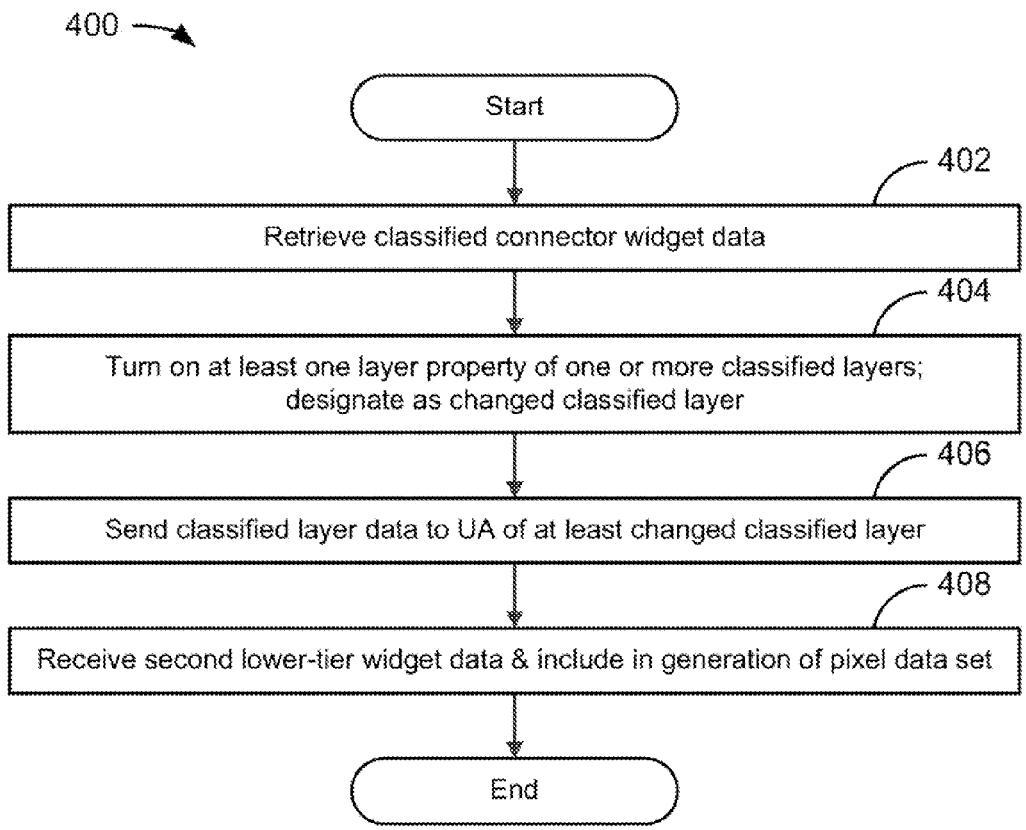

FIG. 7 depicts a flowchart for presenting classified information with unclassified information on the display surface of a display unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
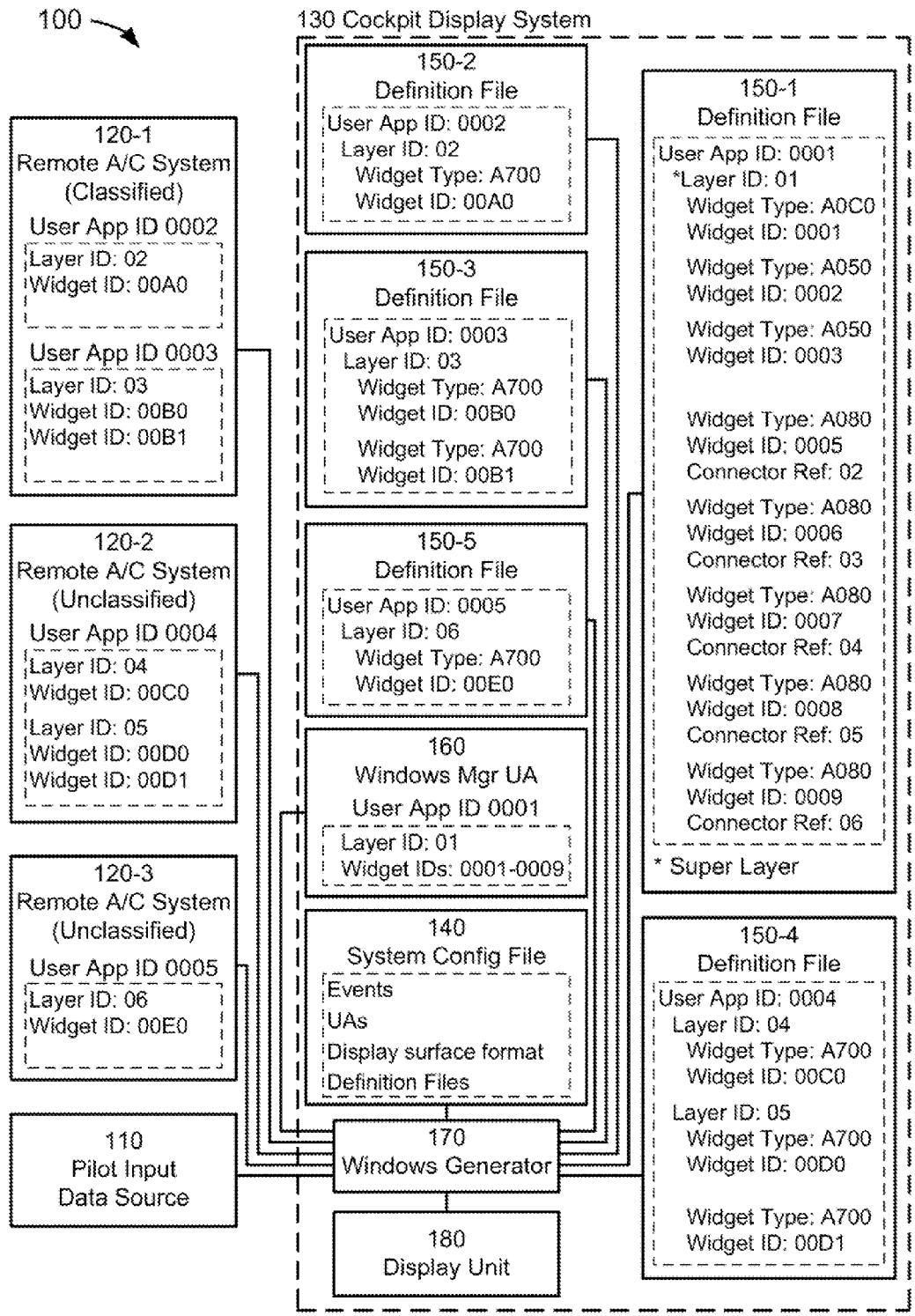
FIG. 1 depicts a block diagram of a windows management and presentation system for controlling the display of classified information with unclassified information on the same surface of an aircraft display unit.

FIG. 1 depicts a block diagram of a windows management and presentation system (collectively, "presentation system") 100 suitable for implementation of the techniques described herein, wherein classified information may be presented with unclassified information on the same display surface of at least one display unit. The presentation system 100 of an embodiment of FIG. 1 includes a pilot input device 110, at least one remote aircraft system 120, and a cockpit display system ("CDS") 130.

In an embodiment of FIG. 1, the pilot input device 110 could comprise any source for facilitating a pilot's interaction with graphical user interfaces ("GUI") referred to as interactive widgets displayed on the surface of a display unit 180 (some non-interactive widgets could also be displayed). The pilot input device 110 may include any device that allows for the manual selection of a widgets and/or entry of data. Such devices could include, but are not limited to, a tactile device (e.g., keyboard, control display unit, cursor control device, touch screen device, etc. . . . ) and/or speech recognition systems. A display unit 180 could be included as a pilot input device 110 if it is able to receive pilot input. As embodied herein, the pilot input device 110 may provide input representative of a pilot's selection to a windows generator ("WG") 170. It should be noted that, although the discussion herein is drawn to the term "pilot," the definition of such term should not be limited to flight personnel but should include ground personnel and/or any viewer of the display unit 180.

In an embodiment of FIG. 1, remote aircraft systems 120 could be comprised of any system installed in an aircraft in which a user application ("UA") has been installed. Types of remote aircraft systems include, but are not limited to, air conditioning, auto flight, communications, electrical power, equipment and furnishings, fire protection, flight controls, fuel, hydraulic power, ice and rain protection, instruments (including the ND), landing gear, lights, navigation (including the FMS, TCAS, WXR, and TAWS), oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

As embodied herein, the UA of the remote systems 130, a system configuration file ("CF") 140, a plurality of definition files (DFs, or singularly "DF") 150, a windows manager UA ("WMUA") 160, and the WG 170 may be software components stored in a digital memory storage device or generator-readable media (i.e., media readable by the WG 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the CF 140, the DFs 150, and the WMUA 160 are illustrated as being internal to the CDS 130, the storage devices storing any one of these may be external to the CDS 130 and used as an internal component of any other system of the aircraft.

Each remote aircraft system 120 could own one or more UAs and the layers included therein, where the layer may be considered as the highest level entity known by each UA. Referring to FIG. 1, remote aircraft system 120-1 owns UAs 0002 and 0003 and layers 02 and 03, remote aircraft system 120-2 owns UA 0004 and layers 04 and 05, and remote aircraft system 120-3 owns UA 0005 and layer 06. In addition to each remote aircraft system 120, the CDS 130 owns WMUA 160 and layer 01.

The UAs of each remote aircraft system 120 may facilitate the dynamic exchange of blocks of data between the CDS 130 and the remote aircraft systems 120, where exchange protocols have been published by Aeronautical Radio, Incorporated ("ARINC") in ARINC Specification 661 entitled "Cockpit Display System Interfaces to User Systems" ("ARINC 661"), an aviation industry standard which is hereby and herein incorporated by reference in its entirety. On the one hand, the UAs of the remote aircraft systems 120 may send real-time parameters measured and/or calculated by the remote aircraft systems 120 to the CDS 130 as updated runtime parameters of one or more widgets; also, UAs may request changes to one or more layer properties such as, but not limited to, layer visibility. Referring to FIG. 1, real-time parameters of remote aircraft systems 120-1 through 120-3 may be sent as runtime parameters of their respective widgets; additionally, requests for runtime changes affecting properties of layers 02 through 06 may be sent.

On the other hand, the CDS 130 may send notices of real-time event occurrences (e.g., events initiated by interactions between a pilot input device 110 and widgets) to the UAs of the remote aircraft systems 120 as well as send notices of layer property changes such as, but not limited to, changes to layer activation. Referring to FIG. 1, a notice of real-time event occurrence may be sent to UAs 0002 through 0005 for interactions with their respective widgets; additionally, notices of runtime changes affecting the properties of layers 02 through 06 may be sent. As embodied herein, the remote aircraft systems 120 may provide input to the WG 170 representative of widget parameters and layer properties; also, the remote aircraft systems 120 may receive output of the WG 170 representative of widget events and layer properties.

In an embodiment of FIG. 1, the CDS 130 may be comprised many components including the system CF 140, the plurality of DFs 150, the WMUA 160, the WG 170, and/or the display unit 180. The system CF 140 may configure the initial settings for the CDS 130. The system CF 140 may be comprised of instructions for establishing a communication link(s) with one or more pilot input devices 110 for the subsequent receiving of input from a pilot's selection(s) through his or her interaction with widget(s), where such input may trigger the WG 170 to recognize event(s) associated with the pilot's selection(s). Also, the system CF 140 may include instructions or information related to the UAs and the layers owned by both the remote aircraft systems 120 and the WMUA 160, the configuration of a display surface format associated with the location of window(s) and the assignment of layer(s) to each window, and the loading and interpreting of the plurality of DFs 150. As embodied herein, the contents of the system CF 140 may be loaded and interpreted by the WG 170.

In an embodiment of FIG. 1, DFs 150 could describe a hierarchical structure of widgets assigned to layers, where the widget could be considered as a building block. Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement Also, each widget could have a graphical look that represents how the object will appear when it is drawn on the display surface of the display unit 180. As state above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box, etc. . . . ), a graphical representation widget (e.g., edit box text, graphical primitive ("GP") line, GP rectangle, label, push button, toggle button, etc. . . . ), a text string widget (edit box text, label, push button, toggle button, etc. . . . ), an interactive widget (e.g., edit box text, push button, toggle button, etc. . . . ), a map management widget (e.g., map grid, horizontal map, horizontal map source, horizontal map item list, etc. . . . ), a dynamic motion widget (e.g., GP line, GP rectangle, label, etc. . . . ), a utility widget (e.g., connector, cursor reference, etc. . . . ), and a UA validation widget (e.g., basic container, edit box text, horizontal map, horizontal map source, mutually exclusive container, push button, radio box, toggle button, etc. . . . ).

A layer could be comprised of a single widget or a grouping of widgets (or a list of widgets). Referring to FIG. 1, layer 01 of DF 150-1 is comprised of a grouping of widgets identified as 0001 through 0009; this layer has been designated as a super layer. Layer 02 of DF 150-2, layer 04 of DF 150-4, and layer 06 of DF 150-5 are comprised of single widgets 00A0, 00C0, and 00E0, respectively. Layer 03 of DF 150-3 is comprised of a grouping of widgets identified as 00B0 and 00B1, and layer 05 of DF 160-4 is comprised of a grouping of widgets identified as 00D0 and 00D1.

A grouping or list of widgets could be drawn in an area of a window defined by a display surface format, where such format may be used for depicting images known to those skilled in the art. Display surface formats could be created from a single layer such as those formats used for depicting a Primary Flight Display ("PFD") or an Engine Indicating and Crew Alerting System ("EICAS"); other display surface formats could be created from a plurality of different layers occupying the same area of a window such as the format used for depicting a Navigation Display ("ND"), where each layer could be associated with one of the following systems: a flight management system ("FMS"), a traffic collision avoidance system ("TCAS"), weather radar system ("WXR"), and/or terrain awareness and warning system ("TAWS").

Each DF 150 could be comprised of a single layer or a grouping of layers. Each DF 150 may specify the definition of widget hierarchical structures and creation of widgets that describe UA interface pages. Referring to FIG. 1, DFs 150-1, 130-2, 130-3, and 130-5 are comprised of single layers 01, 02, 03, and 06, respectively. DF 150-4 is comprised of a grouping of layers 04 and 05. As discussed above, each DF 150 and each layer included therein could be owned by one UA. Referring to FIG. 1, DF 150-1 is owned by WMUA 160, and DFs 150-2 through 130-5 are owned by UAs 0002 through 0005, respectively.

In an embodiment of FIG. 1, the WMUA 160 is representative of one or more UAs that could be owned by the CDS 130. Similar to the UAs of each remote aircraft system 120, the WG 170 may send notices of real-time event occurrences to the WMUA 160 and layer property changes such as changes to layer activation of layer 01. Responding to such notices, the WMUA 160 may update the runtime parameters of one or more widgets and send to the WG 170 requests for changes to one or more layer properties such as the layer visibility and activity of layer 01. As embodied herein, the contents of the DFs 150 may be read by the WG 170.

In an embodiment of FIG. 1, the WG 170 may be any electronic data processing unit which executes software or source code stored, permanently or temporarily, in a digital memory storage device as discussed above. The WG 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the WG 170 could be a processor(s) used by or in conjunction with any other system of the aircraft.

The WG 170 may be programmed or configured to receive as input data representative of information obtained from the pilot input device 110, the remote aircraft systems 120, and the components of the CDS 130. As embodied herein, the terms "programmed" and "configured" are synonymous with respect to the execution of software or source code developed for the specific functions and methods embodied herein. The WG 170 may be electronically coupled to systems and/or sources to facilitate the receipt of input data; as embodied herein, operatively coupled may be considered as interchangeable with electronically coupled. The WG 170 may be programmed to execute the methods embodied herein and discussed in detail below. The WG 170 may be programmed to provide output data to the remote aircraft systems 120, the components of the CDS 130, and the display unit 180. The WG 170 may be electronically coupled to systems and/or units to facilitate the providing of output data representative of a procedure. It is not necessary that a direct connection be made; instead, such receipt of input data and the providing of output data could be provided through a data bus or through a wireless network.

In an embodiment of FIG. 1, the display unit 180 comprises any unit having a display surface on which widgets may be presented to the pilot on a display surface of the display unit 180. The display unit 180 could be, but is not limited to, a PFD, ND, Head-Up Display, Head-Down Display, Multi-Purpose Control Display Unit, EICAS, Electronic Centralized Aircraft Monitor, Multi-Function Display, Side Displays, and Data Link Control Display Unit. As embodied herein, the display unit 180 may receive image data provided by the WG 170.

The WG 170 may be programmed to own and manage one or more windows displayed on the surface of a display unit, where each window may be defined as a physical demarcation of space on the surface of the display unit 180. Such physical demarcation information may have been provided in the system CF 140 and read by the WG 170. The visibility of each window could be managed by the WG 170, wherein each window the appearance of widgets may be based upon both layer properties and widget parameters.

Figure 2A:
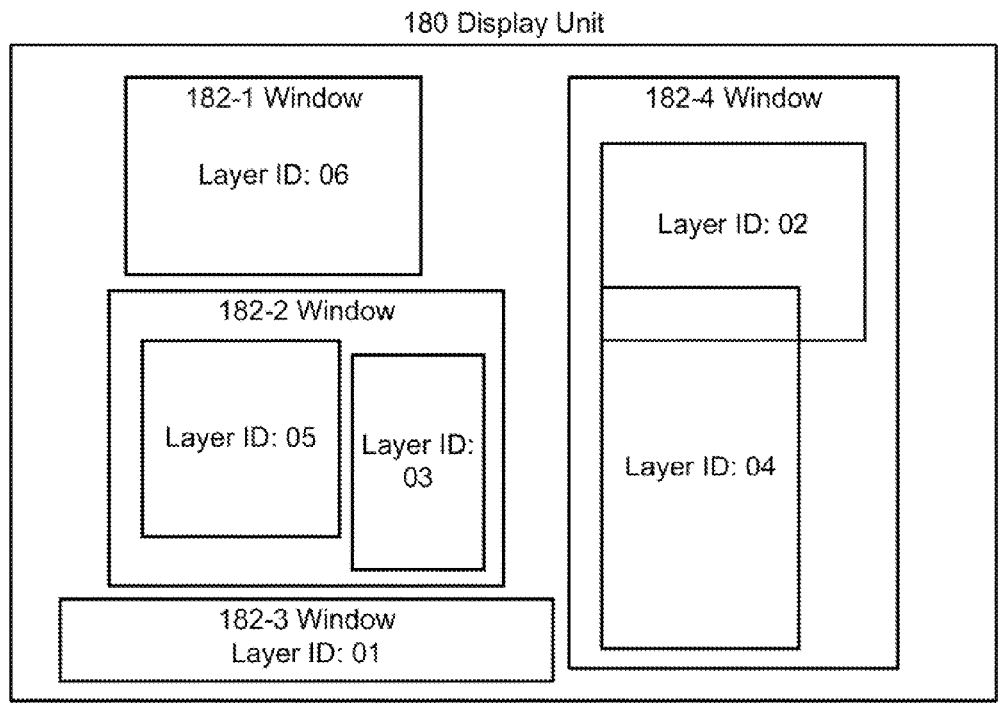
FIG. 2A depicts a display surface format comprised of windows and layers that have been assigned to the windows.

Referring to FIG. 2A, a plurality of windows 182 and layers are depicted for the purpose of illustration only. Based upon the display surface format, the WG 170 has assigned one or more layers to areas in each window 182. Layer 06 has been assigned an area in window 182-1, layers 03 and 05 have been assigned areas in window 182-2 and configured as non-overlapping, layer 01 has been assigned to window 182-3, and layers 02 and 04 have been assigned areas in window 182-4 and configured as overlapping.

Figure 2B:
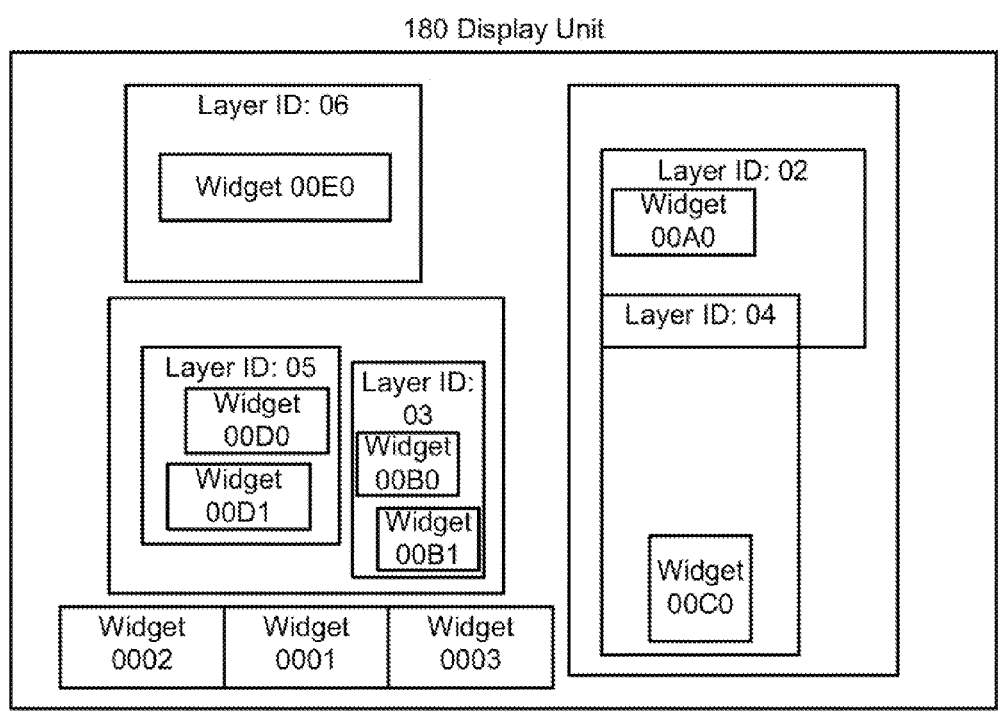
FIG. 2B depicts areas within layers in which widgets may appear.

As stated above, widgets could be considered to be building blocks, where each widget could be defined by a set of parameters that control the graphical and/or interactive characteristics of that widget, where each parameter could be a fixed parameter or a runtime parameter. A widget or a group of widgets could be drawn in an area assigned to their respective layer, where the position of each widget within the layer may be defined by positional information found in the set of widget parameters. Referring to FIG. 2B, the positions of widgets 0001 through 00E0 shown in FIG. 1 within their respective layers are based upon assumed positional information. The positions of the widgets as they appear within their respective layers are depicted for the purpose of illustrating the hierarchal relationship between layers and widgets.

The advantages and benefits of the embodiments discussed herein may be illustrated by showing how ARINC 661 techniques may be adopted for defining and managing security protocols internal to the CDS 130 which provides a centralized control for affirmatively suppressing the unwanted display of classified information while simultaneously permitting the desired display of unclassified information. Classified systems may obtain and process sensitive information to which access may be restricted to a particular group of persons. Typically, there are several levels of sensitivity forming a hierarchical system of secrecy comprised of classification levels. For example, one such hierarchical system could be comprised of the following levels: top secret, secret, confidential, restricted, and unclassified, where top secret may be the highest level of classification and unclassified may be the lowest level of classification. If information is classified as top secret, such information could cause exceptionally grave damage to national or military security if it were made publically available. If classified as secret, such information could cause grave damage if it were made publically available. If classified as confidential, such information could cause damage if it were made publically available. If classified as restricted, such information could cause undesirable effects if it were made publically available. If information does not fit into one of these levels, then such information could be considered unclassified.

Because of the hierarchical nature of a classification system, secret information provided to the CDS 130 includes not only secret information but also lower-level confidential or restricted information along with unclassified information; however, it does not include higher-level top secret information. Similarly, confidential information provided to the CDS 130 includes not only confidential information but also lower-level restricted information along with unclassified information; however, it does not include higher-level top secret and/or secret information. Although the following discussion will be drawn to the preceding hierarchical system, the embodiments disclosed herein are not limited to this specific system and/or its specific levels of classification.

Figure 3:
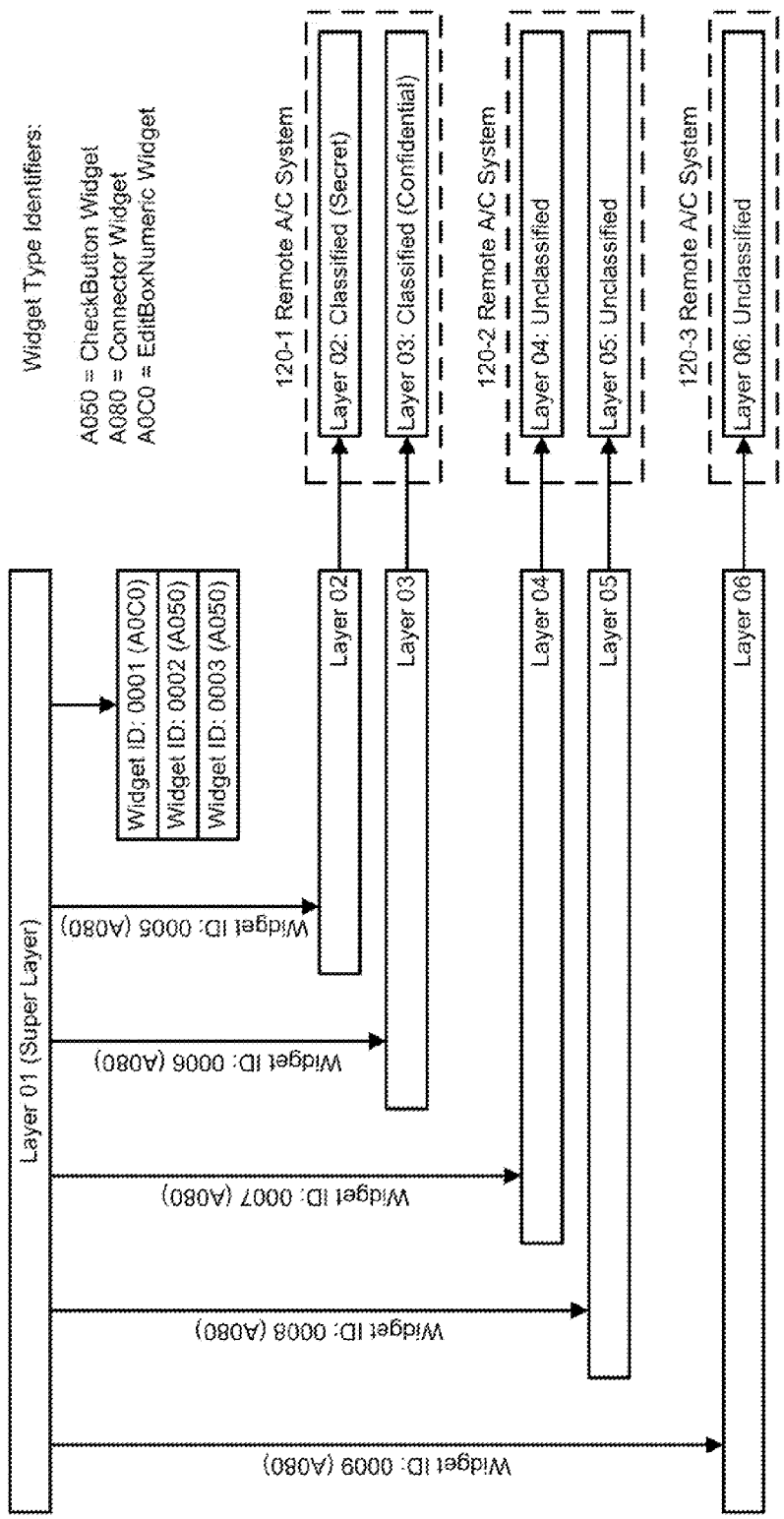
FIG. 3 depicts a hierarchal structure associated with a definition file comprised of a super layer.

In an embodiment of FIG. 3, the hierarchal structure associated with DF 150-1 is illustrated. DF150-1 is comprised of one layer and a plurality of widgets 0001 through 0009. Moreover, layer 01 may be considered a super layer, where such super layer could provide a centralized means of controlling the visibility of classified information simultaneously with unclassified information internally within the CDS 130.

As disclosed herein, a UA owned by a remote aircraft system 120 may associate one layer with one classification level where system provides classified information to the CDS 130. For the purpose of illustration and not of limitation, remote aircraft system 120-1 will be assumed to be comprised of two sub-systems, one sub-system owning layer 02 (of UA 0002) and the other sub-system owning layer 03 (of UA 0003). It will also be assumed that the sub-system owning layer 02 obtains and processes secret information, and that the other sub-system owning layer 03 obtains and processes confidential information.

With one layer associated with one classification level, a connector widget 0005 may connect the super layer 01 to layer 02. Because a connector widget possesses the widget parameter of visibility, secret information represented by the widgets of layer 02 will not be visible to the pilot if the visibility parameter of the connector widget 0005 is turned off. Because the connector widget 0005 falls under super layer 01, the WMUA 160 controls the visibility parameter of the connector widget 0005 as owner of the super layer 01.

In addition to the controlling visibility through widget parameters, visibility may also be controlled by the WG 170 at the layer level by deactivating a layer. If layer visibility is turned off and/or a layer is deactivated, the widgets found in such layer will not be visible regardless of the visibility parameters of the widgets. Even if the WUMA 160 turns on the visibility parameter of connector widget 0005 and the visibility parameters of all of the widgets falling under layer 02 are turned on, the secret information represented by the widgets of layer 02 will not be visible to the pilot if layer 02 has been deactivated by the WG 170.

Likewise, confidential information represented by the widgets of layer 03 will not be visible to the pilot if the visibility parameter of the connector widget 0006 is turned off. Because the connector widget 0006 falls under super layer 01, the WMUA 160 controls the visibility parameter of connector widget 0006. Moreover, even if the WUMA 160 turns on the visibility parameter of connector widget 0006 and the visibility parameters of all of the widgets falling under layer 03 are turned on, the confidential information represented by the widgets of layer 03 will not be visible to the pilot if layer 03 has been deactivated by the WG 170, or both. As disclosed herein, the visibility of classified information may be internally and affirmatively controlled by the CDS 110 through the WMUA 160, the WG 170, or both.

Whether widgets representative of classified information are made visible to the pilot could depend upon his or her selection of and/or access to classified information. As shown in FIG. 3, widgets 0001 through 0003 fall under the super layer 01. Widget 0001 is a numeric edit box widget (i.e., EditBoxNumeric) and widgets 0002 and 0003 are check button widgets (i.e., CheckButton). Prior to classified information being presented on the surface of the display unit 180, these widgets may be employed to conduct a pilot logon procedure. Although the following example will be drawn to these widgets and a procedure which employs them, those skilled in the art know that logon procedures could vary and different widgets could be used. The example discussed with the drawings of FIG. 4 is provided for the purpose of illustration and not of limitation.

Figure 4A:
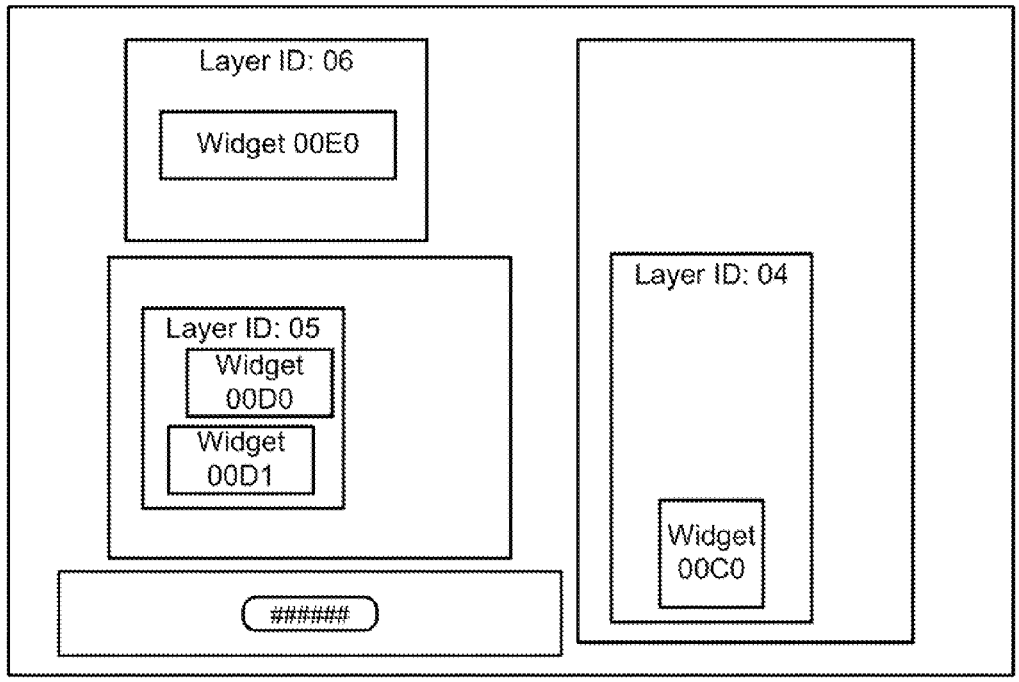
FIG. 4A illustrates the presentation of windows, layers, and widgets associated with unclassified information and a log on procedure.

As shown in FIG. 4A, the unclassified information represented by the widgets under layers 04 through 06 is presented in windows 182-1, 182-2, and 182-4 on the display surface of display unit 180 of FIG. 2. Also, the information represented by numeric edit box widget 0001 under layer 01 is presented in window 182-3; however, the classified information represented by the widgets under layers 02 and 03 is not presented. For the purposes of the following discussion, this will be assumed to be the default windows configuration.

To achieve this default configuration, the WG 170 could be initially programmed to activate layer 01 and layers 04 through 06, to generate one or more data blocks comprised of notices of layer activation, and to send such data blocks to the WMUA 160 of the CDS 110 and the UAs 0004 and 0005 of remote aircraft systems 120-2 and 120-3, respectively. In response, the WMUA 160 and UAs 0004 and 0005 could generate data blocks comprised of commands to turn on the visibility and/or enablement parameter(s) of their respective widgets 0001, 0007-0009, 00C0, 00D0-00D1, and 00E0; the WMUA 160 and UAs 0004 and 0005 could also generate data blocks comprised of commands that request the activation of layers 01 and 04 through 06 and the turning on of the visibility properties of these layers. Then, such data blocks may be sent to the WG 170. It should be noted that, as discussed herein, the activation and generation of data blocks by the WG 170 and user applications may be accomplished through the use of independent software and the sending of data blocks may be accomplished through the use of separate transmission paths.

Programmed with one or more pixel generating algorithms known to those skilled in the art, the WG 170 could then generate pixel data which includes data representative of the presence of numeric edit box widget 0001 and widgets 00C0, 00D0-00D1, and 00E0; connector widgets 0007 through 0009 provide no graphical representation. Then, the WG 170 could send such pixel image data to the display unit 180, where numeric edit box widget 0001 will become visible in window 182-3, widget 0000 will become visible in window 182-4, widgets 00D0 and 00D1 will become visible in window 182-2, and widget 00E0 will become visible in window 182-1. FIG. 4A illustrates the visibility of these widgets.

Under ARINC 661, UAs will not turn on the visibility property of layers until after receiving notices that their respective layers have been activated. Moreover, there is no initial requirement for either widget parameter settings or initial layer property settings.

As disclosed herein, security protocols that take advantage of existing standards specified in ARINC 661 may be established. In one embodiment, manufacturers and/or end users of the remote aircraft systems 120 and the CDS 130 could configure the visibility and/or enablement parameters of all of the widgets appearing in their respective DFs 150 to be turned off. In another embodiment, the visibility and/or enablement parameters of connector widgets 0005 and 0006 appearing in DF 150-1 and connecting to layers of classified remote aircraft system 120-1 could be turned off; the visibility and/or enablement parameters of widgets 00A0, 00B0, and 00B1 respectively appearing in DFs 150-2 and 150-3 could be turned off; or both. In another embodiment, the WG 170 could be programmed to initially deactivate layers 02 and 03 of remote aircraft system 120-1; if so, the WG 170 could generate a data block comprised of notices of layer event for layers 02 and 03 and send such data block to the UAs 0002 and 0003 of remote aircraft system 120-1.

For the assumed default windows configuration in this example, unclassified information is presented in windows 182-1, 182-2, and 182-4, and a logon widget is presented in window 182-3. In another embodiment, the WG 170 could be programmed to exclude presenting logon window 182-3 or to deactivate layer 01, and/or WMUA 160 could be programmed to turn off the visibility to widgets 0001 through 0003; if so, the pilot could perform a step or a series of steps in order to make the logon window 182-3 and/or widget 0001. In another embodiment, the step or a series of steps could include the use of a popup menu widget.

Figure 4B:
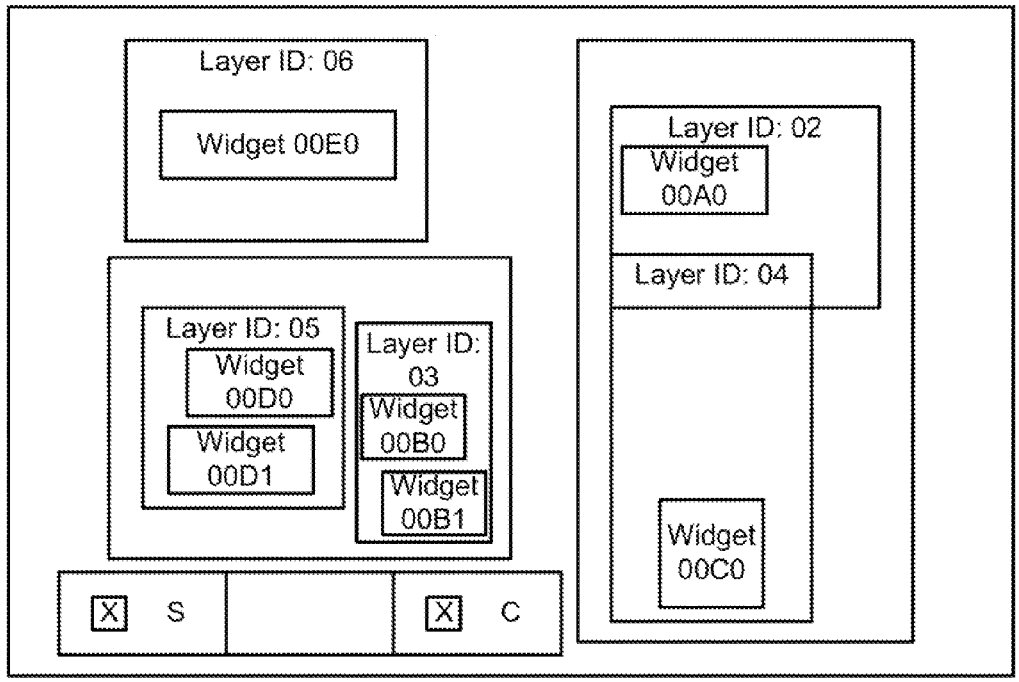
FIG. 4B illustrates the presentation of windows, layers, and widgets associated with classified information of a pilot's first level of security clearance.

In order to logon, the pilot may enter an authorization code where "######" is shown in numeric edit box widget 0001. After the code is entered, WG 170 could generate a data block comprised of a notice of a widget event of widget 0001 and send such data block to the WMUA 160. Programmed with logic for verifying the authorization code, the WMUA 160 could verify the code and determine the classification level to which the pilot has access. If verified and after the level of access has been determined, the WMUA 160 could generate a data block comprised of a command to turn off the visibility and/or enablement parameter(s) of widget 0001 and send such data block to the WG 170. Then, the WG 170 could generate pixel data which includes data representative of the absence of numeric edit box widget 0001 and send such pixel data to the display unit 180, where numeric edit box widget 0001 will become invisible in window 182-3. FIG. 4B illustrates the invisibility of this widget.

In addition, the WMUA 160 could make change(s) to the applicable parameter(s) of widgets 0002 and 0003, where such applicability is dependent upon the classified level to which the pilot is cleared. In this example, check button widget 0002 is associated with secret information and has been configured with a label widget parameter of "S"; check button widget 0003 is associated with confidential information and has been configured with a label widget parameter of "C"; and check button widget 004 is associated with unclassified information and has been configured with a label widget parameter of "U."

If the pilot possesses a secret clearance, the WMUA 160 could generate one or more data blocks comprised of commands to turn on the visibility and/or enablement parameter(s) and to select the state parameter of check button widgets 0002 and 0003, and then send such data blocks to the WG 170. Also, the WMUA 160 could also generate one or more data blocks comprised of commands to turn on the visibility and/or enablement parameter(s) of connector widgets 0005 and 0006, and send such data blocks to the WG 170. If layers 02 and 03 were previously deactivated, then the WG 170 could activate these layers upon receiving the preceding commands from the WMUA 160 turning on the visibility and/or enablement parameter(s) of widgets 0002, 0003, 0005, and 0006. Then, the WG 170 could generate a data block comprised of notices of layer event for layers 02 and 03 and send such data block to the UAs 0002 and 0003 of remote aircraft system 120-1. In response, these UAs could generate data blocks comprised of commands that request the activation of layers 02 and 03 and the turning on of the visibility properties of these layers. Then, the WG 170 could generate pixel data which includes data representative of the presence of check button widgets 0002 and 0003, then send such pixel data to the display unit 180, where numeric edit box widgets 0002 and 0003 with their respective boxes selected will become visible in window 182-3. FIG. 4B illustrates the visibility of these widgets.

Figure 4C:
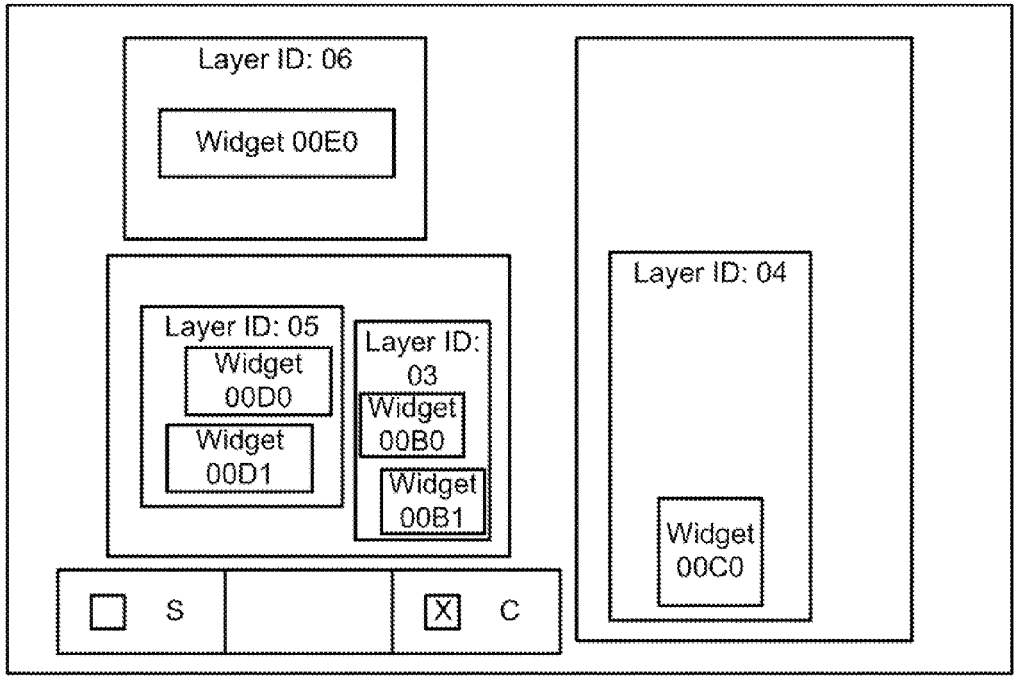
FIGS. 4C-4D illustrate the presentations of windows, layers, and widgets associated with classified information of a pilot's second level of security clearance.

If the pilot wishes to not view secret information, he or she may click on the "X" in the check button widget 0002 shown in FIG. 4B. After being clicked, the WG 170 could generate a data block comprised of a notice of a widget event of widget 0002 and send such data block to the WMUA 160. The WMUA 160 could respond by generating a data block comprised of a command to unselect the state parameter of check button widget 0002 and send such data block to the WG 170. Also, the WMUA 160 could also generate a data block(s) comprised of a command(s) to turn off the visibility and/or enablement parameter(s) of connector widget 0005, and send such data blocks to the WG 170. Alternatively or additionally, the WG 170 could deactivate layer 02 after the "X" in the check button widget 0002 was clicked and generate a data block comprised of a notice of a layer event of layer 02 and send such data block to the UA 0002 of aircraft remote system 120-1. Then, the WG 170 could generate pixel data which includes data representative of an unselected state parameter of check button widget 0002 and the absence of layer 02 (and widget 00A0). Then, WG 170 could send such pixel data to the display unit 180, where the "X" of check button widget 0002 will become invisible in window 182-3 and layer 02 will become invisible in window 182-4. FIG. 4C illustrates these invisibilities.

If the pilot wishes to view secret information again, he or she may click the empty box in the check button widget 0002 shown in FIG. 4C. After being clicked, the WG 170 could generate a data block comprised of a notice of a widget event of widget 0002 and send such data block to the WMUA 160. The WMUA 160 could respond by generating a data block comprised of a command to select the state parameter of check button widget 0002 and send such data block to the WG 170. Also, the WMUA 160 could also generate a data block(s) comprised of a command(s) to turn on the visibility and/or enablement parameter(s) of connector widget 0005, and send such data blocks to the WG 170. Alternatively or additionally, the WG 170 could activate layer 02 after the empty box in the check button widget 0002 was clicked and generate a data block comprised of a notice of a layer event of layer 02 and send such data block to the UA 0002 of aircraft remote system 120-1. In response, this UA could generate a data block comprised of commands that request the activation of layer 02 and the turning on of the visibility property of this layer. Then, the WG 170 could generate pixel data which includes data representative of a selected state parameter of check button widget 0002 and the presence of layer 02 (and widget 00A0). Then, WG 170 could send such pixel data to the display unit 180, where the "X" of check button widget 0002 will become visible in window 182-3 and layer 02 will become visible in window 182-4. FIG. 4B illustrates these visibilities.

Figure 4D:
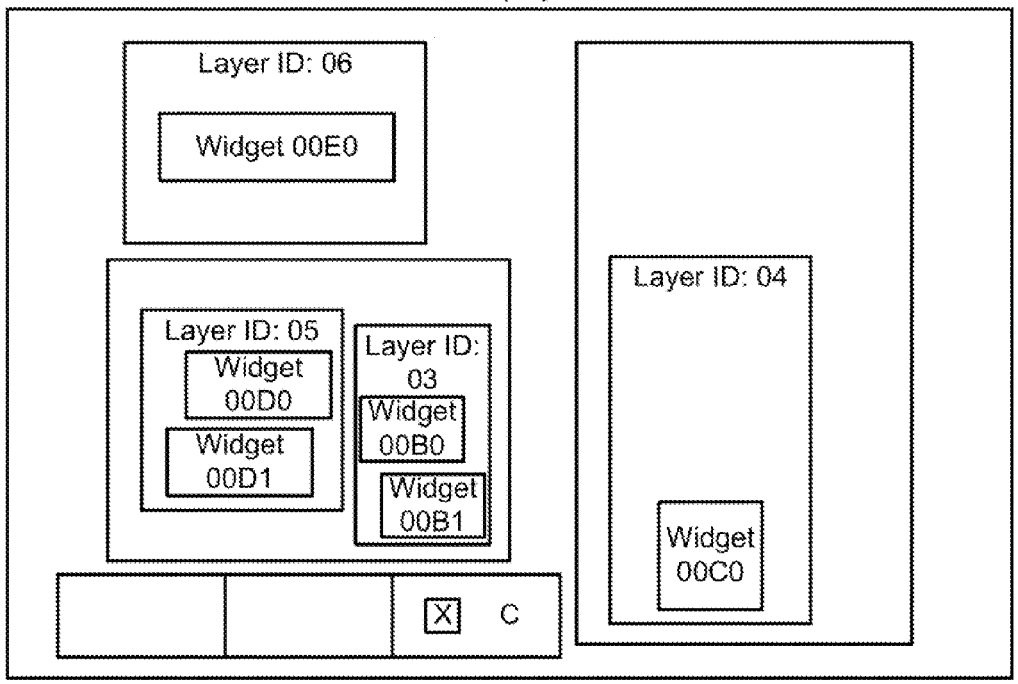

If the pilot possesses a confidential clearance, the WMUA 160 could generate one or more data blocks comprised of commands to turn on the visibility and/or enablement parameter(s) and to select the state parameter of check button widget 0003, and then send such data blocks to the WG 170. Also, the WMUA 160 could also generate one or more data blocks comprised of commands to turn on the visibility and/or enablement parameter(s) of connector widget 0006, and send such data blocks to the WG 170. If layer 03 was previously deactivated, then the WG 170 could activate this layer upon receiving the preceding commands from the WMUA 160 turning on the visibility and/or enablement parameter(s) of widgets 0003 and 0006. Then, the WG 170 could generate a data block comprised of a notice of layer event of layer 03 and send such data block to the UA 0003 of remote aircraft system 120-1. In response, this UA could generate a data block comprised of commands that request the activation of layer 03 and the turning on of the visibility property of this layer. Then, the WG 170 could generate pixel data which includes data representative of the presence of check button widget 0003, then send such pixel data to the display unit 180, where numeric edit box widget 0003 with its box selected will become visible in window 182-3. FIG. 4D illustrates the visibility of these widgets.

Figure 4E:
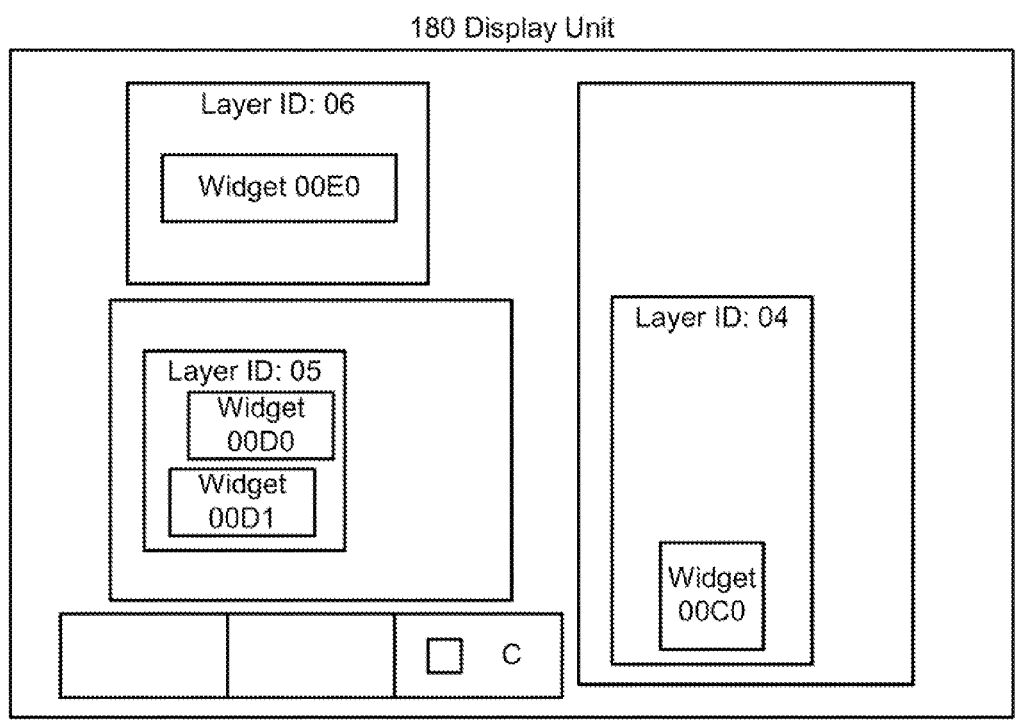
FIG. 4E illustrates the presentation of windows, layers, and widgets associated with unclassified information.

If the pilot wishes to not view confidential information, he or she may click on the "X" in the check button widget 0003 shown in FIG. 4D. After being clicked, the WG 170 could generate a data block comprised of a notice of a widget event of widget 0003 and send such data block to the WMUA 160. The WMUA 160 could respond by generating a data block comprised of a command to unselect the state parameter of check button widget 0003 and send such data block to the WG 170. Also, the WMUA 160 could also generate a data block(s) comprised of a command(s) to turn off the visibility and/or enablement parameter(s) of connector widget 0006, and send such data blocks to the WG 170. Alternatively or additionally, the WG 170 could deactivate layer 03 after the "X" in the check button widget 0003 was clicked and generate a data block comprised of a notice of a layer event of layer 03 and send such data block to the UA 0003 of aircraft remote system 120-1. Then, the WG 170 could generate pixel data which includes data representative of an unselected state parameter of check button widget 0003 and the absence of layer 03 (and widgets 00B0 and 00B1). Then, WG 170 could send such pixel data to the display unit 180, where the "X" of check button widget 0003 will become invisible in window 182-3 and layer 03 will become invisible in window 182-2. FIG. 4E illustrates these invisibilities.

If the pilot wishes to view confidential information again, he or she may click the empty box in the check button widget 0003 shown in FIG. 4E. After being clicked, the WG 170 could generate a data block comprised of a notice of a widget event of widget 0003 and send such data block to the WMUA 160. The WMUA 160 could respond by generating a data block comprised of a command to select the state parameter of check button widget 0003 and send such data block to the WG 170. Also, the WMUA 160 could also generate a data block(s) comprised of a command(s) to turn on the visibility and/or enablement parameter(s) of connector widget 0006, and send such data blocks to the WG 170. Alternatively or additionally, the WG 170 could activate layer 03 after the empty box in the check button widget 0003 was clicked and generate a data block comprised of a notice of a layer event of layer 03 and send such data block to the UA 0003 of aircraft remote system 120-1. In response, this UA could generate a data block comprised of commands that request the activation of layer 03 and the turning on of the visibility property of this layer. Then, the WG 170 could generate pixel data which includes data representative of a selected state parameter of check button widget 0003 and the presence of layer 03 (and widgets 00B0 and 00B1). Then, WG 170 could send such pixel data to the display unit 180, where the "X" of check button widget 0003 will become visible in window 182-3 and layer 03 will become visible in window 182-2. FIG. 4D illustrates these visibilities.

The drawings of FIG. 5 depict flowchart 200 disclosing an example of a method for controlling the display of classified information with unclassified information on the same surface of an aircraft display unit, where the WG 170 may be programmed or configured with instructions corresponding to the following modules embodied in the flowchart. Also, the WG 170 may be a processor of a module such as, but not limited to, a printed circuit board having one or more input interfaces to facilitate the two-way data communications of the WG 170, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Figure 5A:
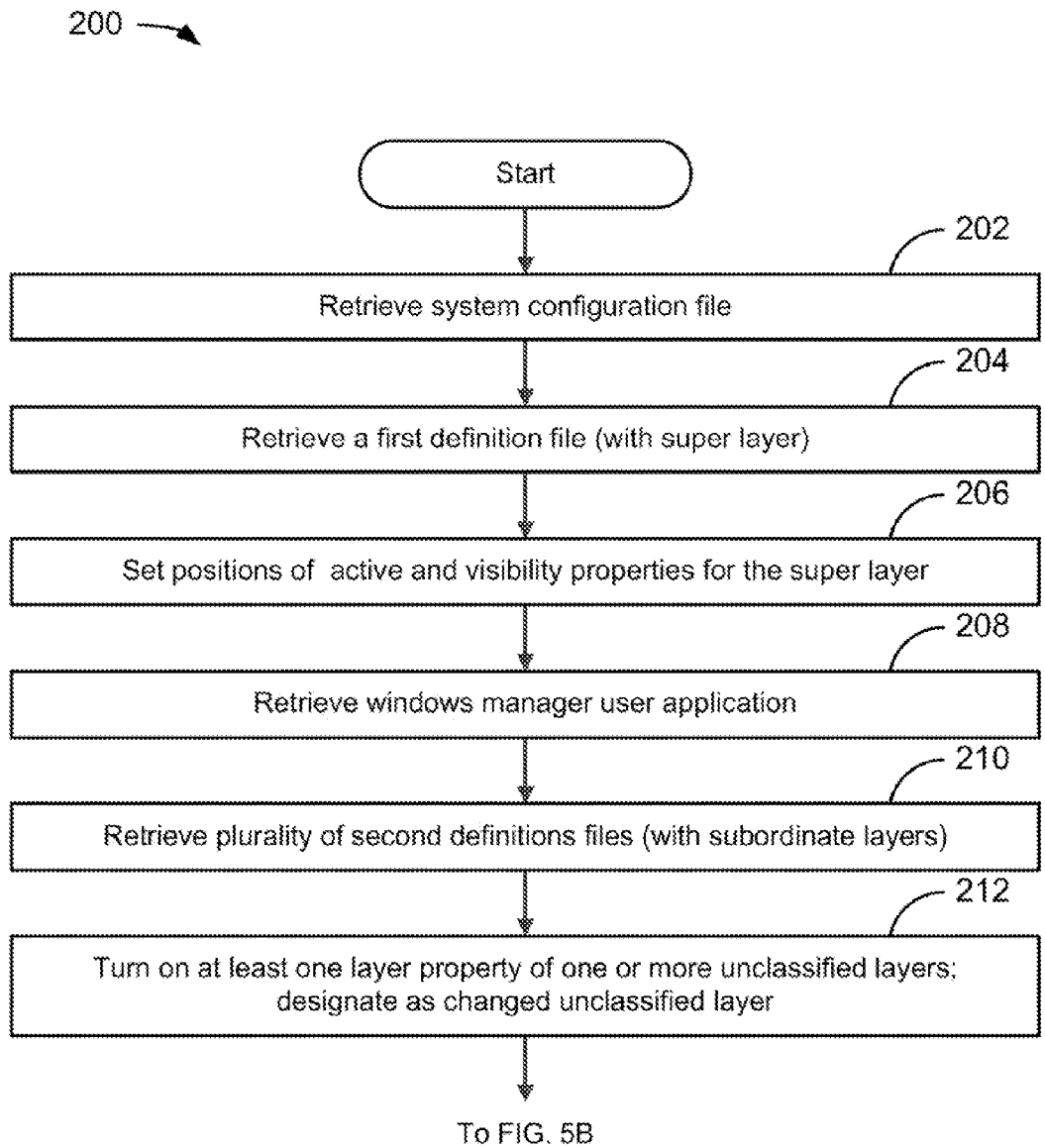

Flowchart 200 begins in FIG. 5A with module 202 with the retrieving of a system CF 140 by the WG 170. The CF 140 could include the identification of one or more subordinate layers identified as unclassified layers, classified layers, or both. The CF 140 could also include the display configuration format which configures the display surface of the display unit 180 with one or more windows. The layers may be assigned to areas within these window(s).

The flowchart continues with module 204 with the retrieving of one definition file comprised of a super layer, which is a layer which facilitates centralized control of the display of classified information with unclassified information. The super layer may be defined by a set of properties which include properties that control the activeness and visibility; the active property and visibility property have on and off positions, and the WG 170 may turn on or off the properties by setting them to either true or false. The super layer may be described as a hierarchical structure to which all subordinate layers are connected and through which the display of widget classified information is internally controlled in the CDS 130 by the WMUA 160 and not externally controlled by a UA of one or more of the remote aircraft systems 120.

The super layer may be comprised of a plurality of first-tier widgets, where each first-tier widget could be defined by a set of parameters which could include a numeric identifier parameter as well as parameters for controlling visibility and enablement of the widget. Visibility and enablement parameters of first-tier widgets have on and off positions controllable, and the WMUA 160 may turn on or off parameters by setting them to either true or false. Although ARINC 661 allows for the use of the same numeric identifier may be used across layers, the embodiments herein limit the use of each numeric identifier to one time. In one embodiment, each numeric widget identifier may be numerically unique among the other widget identifiers in both the super layer and all subordinate layers. In an additional embodiment, the WG 170 may be programmed to ensure that the numeric identifier of all first-tier widgets in the super layer and first-tier widgets in every subordinate layer is numerically unique.

The plurality of first-tier widgets may fall into one of two groups: one group comprised of one or more interactive widgets and the other group comprised of one or more connector widgets. Of the connector widgets, there may be one or more of them connecting to a classified layer called classified connector widgets and one or more of them connecting to an unclassified layer called unclassified connector widgets. ARINC 661 allows two connector widgets to connect to the same layer (i.e., the same layer may be connected to more than one layer); however, if a layer owned by the UA of a classified aircraft system 120 is connected to an unclassified connector widget, then it is possible that classified information could be improperly displayed. In one embodiment, no two connector widgets may connect to the same layer. In an additional embodiment, the WG 170 may be programmed to ensure that no two connector widgets are connected to the same layer.

The flowchart continues with module 206 with the turning on of the active and visibility properties of the super layer. By making these changes, the layer control of the display of classified information with unclassified information by the WG 170 is removed from the super layer. Now, the visibility of both classified and unclassified information may be controlled by the CDS 130 through the connector widgets of the super layer and the layer properties of each subordinate layer, where the former may be controlled by the WMUA 160 and the latter by the WG 170. Moreover, the WG 170 does not need to notify the WMUA 160 of the layer activation although ARINC 661 states that the CDS should notify a UA when a layer is activated.

The flowchart continues with module 208 with the retrieving of the WMUA 160. After being retrieved, the visibility and enablement parameters of each unclassified connector widget of the super layer may be permanently turned on by the WMUA 160. Although the WMUA 160 will no longer control the visibility of the unclassified layers and the widgets found in them, control of the visibility of each widget in an unclassified layer is still controlled by the WG 170 through its control of the visibility property of the layer and the UA 120 through its control of the widget's visibility parameter.

The flowchart continues with module 210 with the retrieving of a plurality of second definition files; that is, those files that are not comprised of the super layer. Each second definition file could be comprised of one or more subordinate layers where each subordinate layer, similar to the super layer, is defined by a set of properties that include active and visibility properties that may be turned on or off by the WG 170. At least one subordinate layer may be a classified layer when it is owned by one user application of one classified aircraft system that is connected to the super layer by one classified connector widget. As stated above, each numeric widget identifier may be numerically unique among the other widget identifiers in both the super layer and all subordinate layers, and the WG 170 may be programmed to ensure that the numeric identifier of all first-tier widgets in the super layer and first-tier widgets in every subordinate layer is numerically unique.

Each subordinate layer may be comprised of one or more first-tier widgets. Similar to the first-tier widgets, each first-tier widget could be defined by a set of parameters which could include a numeric identifier parameter as well as parameters for controlling visibility and enablement of the widget. Also, visibility and enablement parameters of first-tier widgets have on and off positions that may be controlled by a UA by setting the parameters to either true or false, where the UA is the owner of the subordinate layer. As stated above, no two connector widgets may connect to the same layer to prevent the same numeric identifier from being used across layers. As also stated above, the WG 170 may be programmed to ensure that no two connector widgets are connected to the same layer.

The flowchart continues with module 212 with the turning on of one or more layer properties of one or more unclassified layers. In one embodiment disclosed herein, the WG 170 may be programmed to turn on both active and visibility properties of a layer. In another embodiment disclosed herein, the WG 170 may be programmed to turn on the active property of a layer. In either embodiment, the unclassified layer(s) may now be designated as a changed unclassified layer(s).

In an additional embodiment, the active property of one or more classified layers may be turned off; if so, then the classified layer(s) may be now designated as a changed classified layer(s). Although turning off the active property of a layer is not a requirement of ARINC 661, the security protocols disclosed herein could require such affirmative action. If so, then each subordinate layer—either unclassified or classified—will be affirmatively made either active or inactive by the WG 170 before beginning any exchange of data with the UAs.

Modules 202 through 212, inclusive, of FIG. 5A may be considered as being performed in a first phase prior to any exchange of data between the CDS 130 and one or more remote aircraft systems 120. This phase may be comparable with the definition phase as discussed in ARINC 661. Module 214 through 222, inclusive, of FIG. 5B may be considered as being performed in a second phase in which there are exchanges of data between the CDS 130 and one or more remote aircraft systems 120. This phase may be comparable with the run-time phase as discussed in ARINC 661.

Figure 5B:
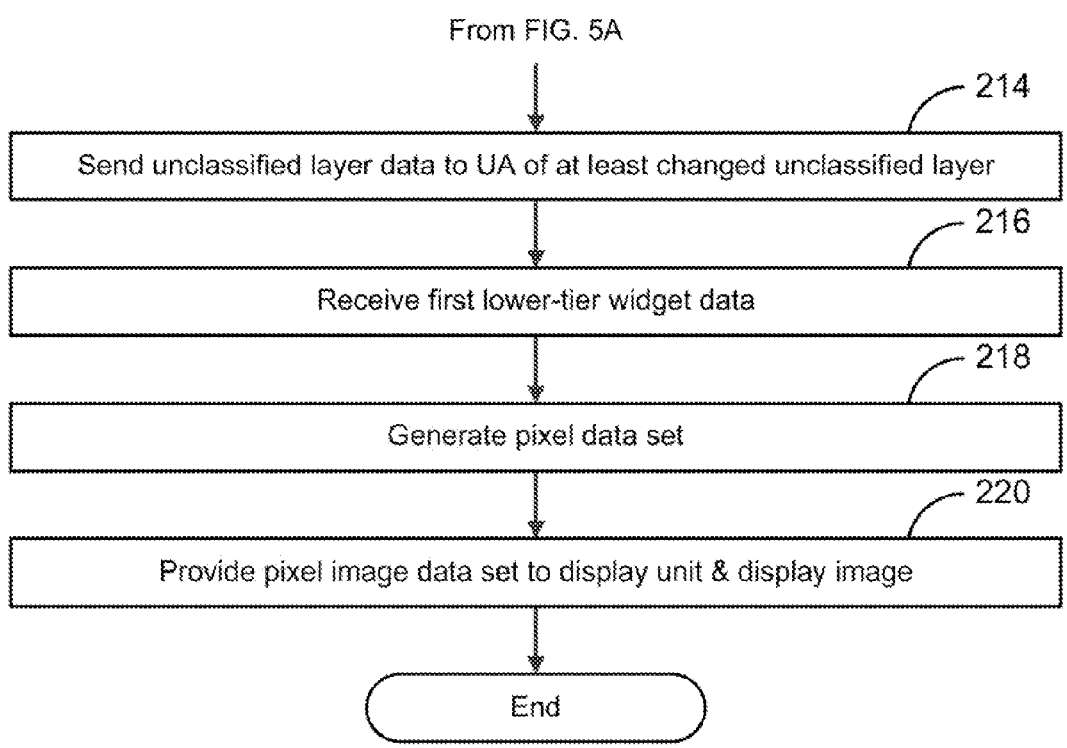

The flowchart continues in FIG. 5B with module 214 with the sending of unclassified layer data to a UA of at least one changed unclassified layer. The unclassified layer data could include information that the layer has been activated by the WG 170 as stated in module 212. In the embodiment of module 212 in which the active property of one or more classified layers has been turned off, classified layer data could be sent to the UA of at least one changed classified layer, where such classified layer data could include information that the layer has now been deactivated by the WG 170.

The flowchart continues with module 216 with the receiving of first first-tier widget data generated by the one or more responsive UAs responding to the sending of unclassified layer data to them in module 214. This first first-tier widget data could be representative of widget parameter information of at least one widget belonging to the changed unclassified layer of each responsive UA. Widget parameter information could include those parameters which are runtime modifiable as known to those skilled in the art.

In the embodiment of module 212 in which both active and visibility properties of the changed unclassified layer were turned on, a request does not need to be made by the responsive UA; this is contrary to that as stated in ARINC 661. Under this embodiment, the UA does not need to be programmed to make such request. In the embodiment of module 212 in which the active property of the changed unclassified layer was turned on, the first first-tier widget data may include a request to turn of the visibility of the widget's changed unclassified layer in the first first-tier widget data. In response to such request, the WG 170 may turn on the visibility property of the changed unclassified layer.

The flowchart continues with module 220 with the generating of a pixel data set based upon, at least, the unclassified layer data, the first first-tier widget data, and the display configuration format. Those skilled in the art understand that widgets may not be presented on the display surface of the display unit 180 if their layers to which the widgets are found have been activated by WG 170 by turning on their active properties; here, the unclassified layer data could include layer activation information. The first first-tier widget data could be comprised of widget parameter information which may define the where and how the each widget is presented on the display surface. The display configuration format could be used to place each widget in its defined area within its assigned window.

The flowchart continues with module 222 with the providing of the pixel image data set to one or more display units 180. From here, the image represented in the pixel image data set may be presented on the display surface(s) of the display unit(s) 180. Then, the flowchart proceeds to the end.

FIG. 6 depicts a flowchart 300 disclosing an example of a method for gaining access to classified information. Flowchart 300 begins with module 302 with the receiving of input data from a pilot input device 110, where such input data may be associated with a procedure to access classified information known to the pilot. This procedure could be initiated from an existing menu from which the pilot has selected the access procedure. As discussed above, one or more user events could be triggered during the access procedure.

The flowchart continues with module 304 with the exchanging of data between the WG 170 and the WMUA 160. As embodied herein, access to classified information could be controlled through the WMUA 160 by using one or more interactive widgets found in the super layer. For each access event, access request data representative of the input data may be sent to the WMUA 160.

In response, the WMUA 160 may generate a response comprised of first-tier interactive widget data representative of parameter information of at least one interactive widget of the super layer and send such response to the WG 170. When received from the WMUA 160, the WG 170 may include the first-tier interactive widget data in the basis upon which the pixel data set may be generated. Here, the first-tier interactive widget data could be comprised of interactive widget parameter information which may define where and how each interactive widget is presented on the display surface in its defined area within its assigned window. Then, the flowchart proceeds to the end.

FIG. 7 depicts a flowchart 400 disclosing an example of a method for presenting classified information with unclassified information already presented on the display surface of the display unit 180. The flowchart begins with module 402 with the receiving of classified connector widget data from the WMUA 160 after a procedure to access classified information was successful and a pilot's level of security classification has been identified during the procedure to access classified information of flowchart 300. Example applications of such procedure were discussed above in detail.

The classified connector widget data could be representative of a run-time change of visibility and enablement parameters to each classified connector widget appropriate to or applicable for the pilot's clearance level, where such run-time change could have been made by the WMUA 160 turning on these widget parameters. The classified connector widget data could be representative of parameter information of one or more classified widgets applicable to the pilot's level of clearance as identified by the access procedure.

The flowchart continues with module 404 with the turning on one or more layer properties of one or more classified layers. In one embodiment disclosed herein, the WG 170 may be programmed to turn on both active and visibility properties of a layer. In another embodiment disclosed herein, the WG 170 may be programmed to turn on the active property of a layer. In either embodiment, the unclassified layer(s) may now be designated as a changed classified layer(s).

The flowchart continues with module 406 with the sending of classified layer data to a UA of at least one changed classified layer. The classified layer data could include information that the layer has been activated by the WG 170 as stated in module 404. In the embodiment of module 212 in which the active property one or more classified layers has been turned off, classified layer data could be sent to the UA of at least one changed classified layer, where such classified layer data could include information that the layer has now been deactivated by the WG 170.

The flowchart continues with module 408 with the receiving of second first-tier widget data generated by the one or more responsive UAs responding to the sending of classified layer data to them in module 406. This second first-tier widget data could be representative of widget parameter information of at least one widget belonging to the changed classified layer of each responsive UA. Widget parameter information could include those parameters which are runtime modifiable as known to those skilled in the art.

In the embodiment of module 404 in which both active and visibility properties of the changed classified layer were turned on, a request does not need to be made by the responsive UA; this is contrary to that as stated in ARINC 661. Under this embodiment, the UA does not need to be programmed to make such request. In the embodiment of module 404 in which the active property of the changed classified layer was turned on, the second first-tier widget data may include a request to turn off the visibility of the widget's changed classified layer in the second first-tier widget data. In response to such request, the WG 170 may turn on the visibility property of the changed classified layer.

After the receiving of second first-tier widget data, the WG 170 may include the second first-tier widget data in the basis upon which the pixel data set may be generated. Here, second first-tier widget data could be comprised of widget parameter information which may define where and how each second first-tier widget is presented on the display surface in its defined area within its assigned window. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for controlling the simultaneous display of multi-level classified information on the same surface of an aircraft display unit, such system comprising:
 a plurality of aircraft systems comprised of
  at least one unclassified system associated with an unclassified level of classification, and
  at least one classified aircraft system associated with a classified level of classification, where
   each unclassified aircraft system and each classified aircraft system owns at least one user application; and
 a cockpit display system comprised of
  a system configuration file,
  a windows manager user application,
  a plurality of definition files,
  at least one display unit, and
  a windows generator configured to
   perform a first operation, where such first operation
    retrieves the system configuration file, wherein
     a plurality of layers is identified, and
     a display configuration format comprised of at least one window is defined, where each layer of the plurality of layers is assigned to one window,
    retrieves one first definition file comprised of a super layer, wherein
     the super layer is defined by a set of layer properties in which an active property and a visibility property are included, where
     the active property and the visibility property of the super layer have on and off positions,
     the super layer is comprised of a plurality of first-tier widgets,
     each first-tier widget is defined by a set of widget parameters in which a visibility parameter, an enablement parameter, and a widget identifier parameter are included, where
     the visibility parameter and the enablement parameter of each first-tier widget have on and off positions, and
     the widget identifier parameter is comprised of a numeric identifier,
     the plurality of first-tier widgets is comprised of a plurality of first-tier connector widgets, where
     the plurality of first-tier connector widgets is comprised of at least one classified connector widget and at least one unclassified connector widget,
    turns on the active property and the visibility property of the super layer,
    retrieves the windows manager user application, where the windows manager user application sets the visibility parameter and enablement parameter of each unclassified connector widget to the on position, retrieves a plurality of second definition files, wherein each second definition file is comprised of at least one subordinate layer, each subordinate layer is defined by a set of layer properties in which an active property and a visibility property are included, where the active property and visibility property of each subordinate layer have on and off positions, at least one subordinate layer is a classified layer, where each classified layer is one layer owned by one user application of one classified aircraft system that is connected to the super layer by one classified connector widget, at least one subordinate layer is an unclassified layer, where each unclassified layer is one layer owned by one user application of one unclassified aircraft system that is connected to the super layer by one unclassified connector widget, each subordinate layer is comprised of at least one lower-tier widget, and each lower-tier widget is defined by a set of widget parameters in which a widget identifier parameter comprised of a numeric identifier is included, and turns on at least one layer property of at least one unclassified layer, where each such unclassified layer is then designated a changed unclassified layer; and perform a second operation, where such second operation sends unclassified layer data to a user application of at least one changed unclassified layer, wherein such unclassified layer data is representative of property information of each changed unclassified layer, receives first lower-tier widget data from at least one first responsive user application responding to the sending of the unclassified layer data, wherein such first lower-tier widget data is representative of parameter information of at least one widget in at least one changed unclassified layer of each responsive user application, generates a pixel data set, where the basis for generating the pixel data set includes the unclassified layer data, the first lower-tier widget data, and the display configuration format, wherein such pixel data set includes data representative of an image comprised of at least one first lower-tier widget of at least one unclassified layer, and each first lower-tier widget appears in the window assigned to its unclassified layer, and provides the pixel data set to the at least one display unit, whereby the image represented in the pixel data set is presented on the surface of the display unit.

2. The system of claim 1, wherein the numeric identifier of each first-tier widget and of each lower-tier widget is unique among all of the widgets in the super layer and all subordinate layers, the first operation further ensures that each numeric identifier is unique among all of the widgets in the super layer and all subordinate layers, or both.

3. The system of claim 1, wherein no two connector widgets are connected to the same layer, the first operation further ensures that no two connector widgets are connected to the same layer, or both.

4. The system of claim 1, wherein the windows manager user application sets the visibility parameter and enablement parameter of each unclassified connector widget to the on position permanently.

5. The system of claim 1, wherein each changed unclassified layer was designated as a changed unclassified layer as the result of its active property and visibility property being turned on.

6. The system of claim 5, wherein the first operation further turns off the active property of at least one classified layer, where each classified layer is then designated a changed classified layer.

7. The system of claim 6, wherein the second operation further sends classified layer data to a user application of at least one changed classified layer, wherein such classified layer data is representative of property information of at least one changed classified layer.

8. The system of claim 1, wherein each changed unclassified layer was designated as a changed unclassified layer as the result of its active property being turned on, such that the first lower-tier widget data includes first request data representative of a request to turn on the visibility property of at least one designated unclassified layer of each responsive user application, whereby the position of the visibility property of each such designated unclassified layer of each responsive user application is turned on in response to the request.

9. The system of claim 8, wherein the first operation further turns off the active property of at least one classified layer, where each classified layer is then designated a changed classified layer.

10. The system of claim 9, wherein the second operation further sends classified layer data to a user application of at least one changed classified layer, wherein such classified layer data is representative of property information of at least one changed classified layer.

11. The system of claim 1, further comprising:

a pilot input device, such that the second operation further receives input data from the pilot input device, where such input data is associated with a procedure to access classified information and is comprised of at least one access event; and exchanges data with the windows manager user application for each access event, where access request data representative of the input data is sent to the windows manager user application with each access event, and first-tier interactive widget data is received from the windows manager user application responding to each sending of access request data, wherein such first-tier interactive widget data is representative of parameter information of at least one interactive widget in the super layer, whereby the first-tier interactive widget data is included in the basis upon which the pixel data set is generated, such that at least one first-tier interactive widget of the super layer is included in the image, such that each first-tier interactive widget appears in the window assigned to the super layer.

12. The system of claim 11, wherein the second operation further receives classified connector widget data from the windows manager user application after the exchanging of data with the windows manager user application for each access event has been completed and a pilot's level of security clearance has been identified during the procedure to access classified information, wherein such classified connector widget data is representative of at least visibility parameter information of at least one classified connector widget applicable for the pilot's level of security clearance;
   turns on at least one layer property of at least one classified layer, where each such classified layer is then designated a changed classified layer;
   sends classified layer data to a user application of at least one changed classified layer, wherein such classified layer data is representative of property information of each such changed classified layer; and
   receives second lower-tier widget data from at least one second responsive user application responding to the sending of the classified layer data,
      wherein such second lower-tier widget data is representative of parameter information of at least one widget in the changed classified layer of each second responsive user application, whereby
      the second lower-tier widget data is included in the basis upon which the pixel data set is generated, such that
      at least one second lower-tier widget of at least one classified layer is included in the image, such that each second lower-tier widget appears in the window assigned to its classified layer.

13. The system of claim 12, wherein each changed classified layer was designated as a changed classified layer as the result of its active property and visibility property being turned on.

14. The system of claim 12, wherein each changed classified layer was designated as a changed classified layer as the result of its active property being turned on, such that
   the second lower-tier widget data includes second request data representative of a request to turn on the visibility property of at least one designated classified layer of each responsive user application, whereby
   the position of the visibility property of each such designated classified layer of each responsive user application is turned on in response to the request.

15. A system for controlling the simultaneous display of multi-level classified information on the same surface of an aircraft display unit, such system comprising:
   a plurality of aircraft systems comprised of
      at least one first aircraft system associated with a first classified level of classification, and
      at least one second aircraft system associated with a classified level of classification other than the first classified level of classification, where
         each first aircraft system and each second aircraft system owns at least one user application; and
   a cockpit display system comprised of
      a system configuration file,
      a windows manager user application,
      a plurality of definition files,
      at least one display unit, and
      a windows generator configured to
         perform a first operation, where such first operation
            retrieves the system configuration file, wherein
               a plurality of layers is identified, and
               a display configuration format comprised of at least one window is defined, where each layer of the plurality of layers is assigned to one window,
            retrieves one first definition file comprised of a super layer, wherein
               the super layer is defined by a set of layer properties in which an active property and a visibility property are included, where
               the active property and the visibility property of the super layer have on and off positions,
               the super layer is comprised of a plurality of first-tier widgets,
               each first-tier widget is defined by a set of widget parameters in which a visibility parameter, an enablement parameter, and a widget identifier parameter are included, where
                  the visibility parameter and the enablement parameter of each first-tier widget have on and off positions, and
                  the widget identifier parameter is comprised of a numeric identifier,
               the plurality of first-tier widgets is comprised of a plurality of first-tier connector widgets, where
                  the plurality of first-tier connector widgets is comprised of at least one first classified connector widget and at least one second classified connector widget,
            turns on the active property and the visibility property of the super layer,
            retrieves the windows manager user application, where the windows manager user application sets the visibility parameter and enablement parameter of at least one first-tier connector widget to the on position,
            retrieves a plurality of second definition files, wherein
               each second definition file is comprised of at least one subordinate layer,
               each subordinate layer is defined by a set of layer properties in which an active property and a visibility property are included, where
                  the active property and visibility property of each subordinate layer have on and off positions,
               at least one subordinate layer is a first classified layer, where
                  each first classified layer is one layer owned by one user application of one first aircraft system that is connected to the super layer by one first classified connector widget,
               at least one subordinate layer is a second classified layer, where
                  each second classified layer is owned by one user application of one second aircraft system that is connected to the super layer by one second classified connector widget,
               each subordinate layer is comprised of at least one lower-tier widget, and
               each lower-tier widget is defined by a set of widget parameters in which a widget identifier parameter comprised of a numeric identifier is included, and turns on at least one layer property of at least one first classified layer, where each such first classified layer is then designated a changed first classified layer; and perform a second operation, where such second operation sends first classified layer data to a user application of at least one changed first classified layer, wherein such first classified layer data is representative of property information of each changed first classified layer, receives first lower-tier widget data from at least one first responsive user application responding to the sending of the first classified layer data, wherein such first lower-tier widget data is representative of parameter information of at least one widget in at least one changed first classified layer of each responsive user application, generates a pixel data set, where
the basis for generating the pixel data set includes the first classified layer data, the first lower-tier widget data, and the display configuration format, wherein
such pixel data set includes data representative of an image comprised of at least one first lower-tier widget of at least one first classified layer, and
each first lower-tier widget appears in the window assigned to its first classified layer, and provides the pixel data set to the at least one display unit, whereby the image represented in the pixel data set is presented on the surface of the display unit.

16. The system of claim 15, wherein the first classified level of classification is an unclassified level of classification.

17. A method employed by a processor in a cockpit display system for controlling the simultaneous display of multi-level classified information on the same surface of an aircraft display unit, such method comprising:

performing a first operation comprised of
retrieving a system configuration file, wherein
a plurality of layers is identified, and
a display configuration format comprised of at least one window is defined, where each layer of the plurality of layers is assigned to one window,
retrieving one first definition file comprised of a super layer, wherein
the super layer is defined by a set of layer properties in which an active property and a visibility property are included, where
the active property and the visibility property of the super layer have on and off positions,
the super layer is comprised of a plurality of first-tier widgets,
each first-tier widget is defined by a set of widget parameters in which a visibility parameter, an enablement parameter, and a widget identifier parameter are included, where
the visibility parameter and the enablement parameter of each first-tier widget have on and off positions, and
the widget identifier parameter is comprised of a numeric identifier,
the plurality of first-tier widgets is comprised of a plurality of first-tier connector widgets, where the plurality of first-tier connector widgets is comprised of at least one classified connector widget and at least one unclassified connector widget, where turning on the active property and the visibility property of the super layer, retrieving a windows manager user application, where the windows manager user application sets the visibility parameter and enablement parameter of each unclassified connector widget to the on position, retrieving a plurality of second definition files, wherein
each second definition file is comprised of at least one subordinate layer,
each subordinate layer is defined by a set of layer properties in which an active property and a visibility property are included, where
the active property and visibility property of each subordinate layer have on and off positions,
at least one subordinate layer is a classified layer, where
such classified layer is one layer owned by one user application of one classified aircraft system that is connected to the super layer by one classified connector widget,
at least one subordinate layer is an unclassified layer, where
each unclassified layer is owned by one user application of one unclassified aircraft system that is connected to the super layer by one unclassified connector widget,
each subordinate layer is comprised of at least one lower-tier widget, and
each lower-tier widget is defined by a set of widget parameters in which a widget identifier parameter comprised of a numeric identifier is included, and turning on at least one layer property of at least one unclassified layer, where each such unclassified layer is then designated a changed unclassified layer; and performing a second operation comprised of
sending unclassified layer data to a user application of at least one changed unclassified layer, wherein such unclassified layer data is representative of property information of each changed unclassified layer, receiving first lower-tier widget data from at least one first responsive user application responding to the sending of the unclassified layer data, wherein such first lower-tier widget data is representative of parameter information of at least one widget in at least one changed unclassified layer of each responsive user application, generating a pixel data set, where
the basis for generating the pixel data set includes the unclassified layer data,
the first lower-tier widget data, and the display configuration format, wherein
such pixel data set includes data representative of an image comprised of at least one first lower-tier widget of at least one unclassified layer, and
each first lower-tier widget appears in the window assigned to its unclassified layer, and providing the pixel data set to at least one display unit, whereby the image represented in the pixel data set is presented on the surface of the display unit.

18. The method of claim 17, wherein
the numeric identifier of each first-tier widget and of each lower-tier widget is unique among all of the widgets in the super layer and all subordinate layers, the first operation is further comprised of ensuring that each numeric identifier is unique among all of the widgets in the super layer and all subordinate layers, or both.

19. The method of claim 17, wherein
no two connector widgets are connected to the same layer,
the first operation is further comprised of ensuring that no two connector widgets are connected to the same layer, or
both.

20. The method of claim 17, wherein the windows manager user application sets the visibility parameter and enablement parameter of each unclassified connector widget to the on position permanently.

21. The method of claim 17, wherein each changed unclassified layer was designated as a changed unclassified layer as the result of its active property and visibility property being turned on.

22. The method of claim 21, wherein the first operation is further comprised of turning off the active property of at least one classified layer, where each classified layer is then designated a changed classified layer.

23. The method of claim 22, wherein
the first operation is further comprised of sending classified layer data to a user application of at least one changed classified layer, wherein
such classified layer data is representative of property information of at least one changed classified layer.

24. The method of claim 17, wherein each changed unclassified layer was designated as a changed unclassified layer as the result of its active property being turned on, such that
the first lower-tier widget data includes first request data representative of a request to turn on the visibility property of at least one designated unclassified layer of each responsive user application, whereby
the position of the visibility property of each such designated unclassified layer of each responsive user application is turned on in response to the request.

25. The method of claim 24, wherein the first operation is further comprised of turning on the active property of at least one classified layer, where each classified layer is then designated a changed classified layer.

26. The method of claim 25, wherein
the first operation is further comprised of sending classified layer data to a user application of at least one changed classified layer, wherein
such classified layer data is representative of property information of at least one changed classified layer.

27. The method of claim 17, wherein the second operation is further comprised of:
receiving input data from a pilot input device, where such input data is associated with a procedure to access classified information and is comprised of at least one access event; and
exchanging data with the windows manager user application for each access event, where
access request data representative of the input data is sent to the windows manager user application with each access event, and
first-tier interactive widget data is received from the windows manager user application responding to each sending of access request data, wherein
such first-tier interactive widget data is representative of parameter information of at least one interactive widget in the super layer, whereby
the first-tier interactive widget data is included in the basis upon which the pixel data set is generated, such that
at least one first-tier interactive widget of the super layer is included in the image, such that each first-tier interactive widget appears in the window assigned to the super layer.

28. The method of claim 27, wherein the second operation is further comprised of:
receiving classified connector widget data from the windows manager user application after the exchanging of data with the windows manager user application for each access event has been completed and a pilot's level of security clearance has been identified during the procedure to access classified information, wherein such classified connector widget data is representative of at least visibility parameter information of at least one classified connector widget applicable for the pilot's level of security clearance;
turning on at least one layer property of at least one classified layer, where each such classified layer is then designated a changed classified layer;
sending classified layer data to a user application of at least one changed classified layer, wherein such classified layer data is representative of property information of each such changed classified layer; and
receiving second lower-tier widget data from at least one first responsive user application responding to the sending of the classified layer data, wherein
such second lower-tier widget data is representative of property information of at least one widget in the changed classified layer of each responsive user application, whereby
the second lower-tier widget data is included in the basis upon which the pixel data set is generated, such that
at least one second lower-tier widget of at least one classified layer is included in the image, such that each second lower-tier widget appears in the window assigned to its classified layer.

29. The method of claim 28, wherein each changed classified layer was designated as a changed classified layer as the result of its active property and visibility property being turned on.

30. The method of claim 28, wherein each changed classified layer was designated as a changed classified layer as the result of its active property being turned on, such that
the second lower-tier widget data includes second request data representative of a request to turn on the visibility property of at least one designated classified layer of each responsive user application, whereby
the position of the visibility property of each such designated classified layer of each responsive user application is turned on in response to the request.

* * * * *